United States Patent [19]

Takeshita

[11] Patent Number: 5,348,996
[45] Date of Patent: Sep. 20, 1994

[54] RESIN COMPOSITION

[75] Inventor: Shinji Takeshita, Mihara, Japan

[73] Assignee: Teijin Chemicals, Ltd., Tokyo, Japan

[21] Appl. No.: 873,110

[22] Filed: Apr. 24, 1992

[30] Foreign Application Priority Data

Apr. 26, 1991 [JP] Japan .................... 3-122795

[51] Int. Cl.$^5$ .............................. C08K 5/54
[52] U.S. Cl. ...................... 524/188; 524/413
[58] Field of Search ......................... 524/188, 413

[56] References Cited

U.S. PATENT DOCUMENTS 4,598,129 7/1986 Borman et al. ................ 525/439
4,699,935 10/1987 Sano ............................. 523/286

FOREIGN PATENT DOCUMENTS 3-14865 1/1991 Japan .

*Primary Examiner*—Paul R. Michl
*Assistant Examiner*—John J. Guarriello
*Attorney, Agent, or Firm*—Sherman and Shalloway

[57] ABSTRACT

A resin composition is provided which comprises: (I) a resin component composed of an aromatic polycarbonate resin, or a mixture of 30% by weight or more of an aromatic polycarbonate resin and 70% by weight or less of another thermoplastic resin; and (II) a compounding component including: (A) potassium titanate in an amount of 1 part by weigh or more per 100 parts by weight of the resin component, (B) an organic acid in an amount of 0.1 to 10% by weight based on the weight of the potassium titanate, and (C) N-phenyl-γ-aminopropyl-trimethoxysilane in an amount of 0.01 to 5% by weight based on the weight of the potassium titanate. Although the resin composition contains potassium titanate, the molecular weight of the aromatic polycarbonate resin in the resin composition does not decrease too to such an extent that practical utilization of molded articles therefrom would be impossible but the resin composition can give molded articles which maintain excellent properties inherent to the aromatic polycarbonate resin and have excellent dimension stability.

8 Claims, No Drawings

RESIN COMPOSITION

A resin composition is provided which comprises: (I) a resin component composed of an aromatic polycarbonate resin, or a mixture of 30% by weight or more of an aromatic polycarbonate resin and 70% by weight or less of another thermoplastic resin; and (II) a compounding component including: (A) potassium titanate in an amount of 1 part by weight or more per 100 parts by weight of the resin component, (B) an organic acid in an amount of 0.1 to 10% by weight based on the weight of the potassium titanate, and (C) N-phenyl-γ-aminopropyl-trimethoxysilane in an amount of 0.01 to 5% by weight based on the weight of the potassium titanate. Although the resin composition contains potassium titanate, the molecular weight of the aromatic polycarbonate resin in the resin composition does not decrease to such an extent that practical utilization of molded articles therefrom would be impossible but the resin composition can give molded articles which maintain excellent properties inherent to the aromatic polycarbonate resin and have excellent dimension stability.

The present invention relates to a resin composition comprising an aromatic polycarbonate resin composition or an aromatic polycarbonate resin and one or more other thermoplastic resins which resin composition can give rise to molded articles that maintain excellent properties aromatic polycarbonate resins have and that have excellent dimension stability.

Heretofore, it has been known to obtain molded articles having improved dimension stability by compounding a thermoplastic resin with an inorganic filler. However, in the case where aromatic polycarbonate resins are used as the thermoplastic resin, they have a serious disadvantage in that the carbonate bonds in the molecule are broken and hence their molecular weight decreases considerably when they are compounded with the inorganic filler. The decrease in molecular weight is outstanding when potassium titanate is compounded. For example, when an aromatic polycarbonate having a viscosity-average molecular weight of 25,000 is compounded with about 10% weight of potassium titanate, the viscosity-average molecular weight of the resulting composition becomes 15,000 or lower, which indicates that the product is difficult to be used practically.

In order to overcome the aforementioned defect, Japanese Patent Application Laid-Open No. 14865/1991 discloses that a specified amount of an organic acid compounded in aromatic polycarbonates controls decrease in the molecular weight of the aromatic polycarbonate. While this conventional method can control decrease in the molecular weight of aromatic polycarbonate as disclosed in the above-described publication, the effect obtained is insufficient.

It is an object of the present invention to provide a resin composition comprising an aromatic polycarbonate resin composition or an aromatic polycarbonate resin and one or more other thermoplastic resins which resin composition does not undergo decrease in molecular weight of the resin used to such an extent that practical use of molded articles obtained therefrom becomes difficult despite the fact that potassium titanate is compounded therein, but can give rise to molded articles that maintain excellent properties aromatic polycarbonate resins have inherently and that have excellent dimension stability.

As a result of intensive investigation with view to achieving the aforementioned object, the present inventors have now found that by compounding the resin composition with a specified amount of an organic acid and a specified amount of a specified silane coupling agent in combination, the decrease in molecular weight of the aromatic polycarbonate resin can be controlled considerably as compared with the compounding of the organic acid or silane coupling agent singly.

Therefore, according to the present invention, there is provided a resin composition which comprises: (I) a resin component composed of an aromatic polycarbonate resin, or a mixture of 30% by weight or more of an aromatic polycarbonate resin and 70% by weight or less of another thermoplastic resin; and (II) a compounding component including: (A) potassium titanate in an amount of 1 part by weigh or more per 100 parts by weight of the resin component, (B) an organic acid in an amount of 0.1 to 10% by weight based on the weight of the potassium titanate, and (C) N-phenyl-γ-aminopropyl-trimethoxysilane in an amount of 0.01 to 5% by weight based on the weight of the potassium titanate.

The aromatic polycarbonate resin used in the present invention is an aromatic polycarbonate resin derived from a divalent polyphenyl and having a viscosity-average molecular weight of 10,000 to 100,000, and more preferably 13,000 to 40,000, which resin is usually prepared by reacting a divalent phenol and a carbonate precursor by a solution method or a melting method. Representative examples of the divalent phenol includes 2,2-bis(4-hydroxyphenyl)propane (so-called bisphenol A), bis(4-hydroxyphenyl)methane, 2,2-bis(4-hydroxy-3,5-dimethylphenyl(propane, 2,2-bis(4-hydroxy-3,5-dibromophenyl)propane, 2,2-bis(4-hydroxy-3-methylphenyl)-propane, bis(4-hydroxyphenyl)sulfone, etc. Preferred divalent phenols are bis(4-hydroxyphenyl)alkanes, particularly bisphenol A. As the carbonate precursor, there can be cited, for example, carbonyl halides, carbonyl esters, haloformates, etc., and more specifically, phosgene, diphenyl carbonate, dihaloformates of divalent phenols, and mixtures thereof. Upon preparation of the aromatic polycarbonate resin, the divalent phenols may be used singly or two or more of them may be used in combination. If desired, suitable molecular weight controlling agents, branching agents, catalysts for promoting the reaction, and the like can be used. Needless to say, two or more aromatic polycarbonate resins may be used in combination.

In the resin composition of the present invention, the other thermoplastic resin which is used in combination with the aromatic polycarbonate resin may be any thermoplastic resin which is compatible with the aromatic polycarbonate resin. For example, there can be used one or more resins selected from thermoplastic polyester resins, polyarylene ester resins, polystyrene resins, polyethylene resins, polypropylene resins, polydiene resins, polyamide resins, polyether resins, polysulfone resins, polyphenylene sulfide resins and the like singly or as a mixture. Proportion of the thermoplastic resins used is 70% by weight or less based on the total weight of the aromatic polycarbonate resin and the thermoplastic resin. If the proportion of the thermoplastic resin is too large, the effect of controlling decrease in molecular weight of the aromatic polycarbonate resin caused by the addition of potassium titanate will not be obtained sufficiently, resulting in that the present invention cannot exhibit sufficient effects.

The thermoplastic polyester resins are polymers or copolymers obtained by condensation reaction between an acid component composed mainly of an aromatic dicarboxylic acid or its ester-forming derivatives and a diol component composed mainly of a diol or its ester-forming derivatives. Preferred examples of the aromatic dicarboxylic acid include terephthalic acid, isophthalic acid, naphthalenedicarboxylic acid, etc. Preferred examples of the diols include linear methylene chain type aliphatic diols having 2 to 10 carbon atoms, polyalkylene glycols, alicyclic diols having 6 to 15 carbon atoms, etc., more specifically, ethylene glycol, trimethylene glycol, tetramethylene glycol, hexamethylene glycol, neopentyl glycol, 3-methylpentanediol-2,4, 2-methylpentanediol-2,4, 2-methylpentanediol-1,4, 2-ethyl-hexanediol-1,3, diethylene glycol, cyclohexanedimethanol, etc. Preferred thermoplastic polyester resin includes polyethylene terephthalate, polybutylene terephthalate, and copolyester resins obtained by replacing 30 mole % or less of the acid component and/or diol component by other compounds cited for the component(s).

The polyarylene ester resin includes polymers and copolymers obtained by condensation reaction between a phenol component composed mainly of a divalent phenol or its derivatives, and an aromatic acid composed mainly of an aromatic dicarboxylic acid or its derivatives. As the divalent phenol, those described above in relation to the aromatic polycarbonate resin may be used preferably. The derivatives of the divalent phenol are diesters of the aforementioned divalent phenol and an aliphatic or aromatic dicarboxylic acid. As the aromatic dicarboxylic acid, those described above in relation to the thermoplastic polyester resin may be used preferably. For preparing the polyarylene ester resin from the divalent phenol or its derivatives and the aromatic dicarboxylic acid or its derivatives, there can be used any conventional methods such as interface polycondensation method, solution polycondensation method, melting polycondensation method, etc.

As the polystyrene resin, there can be cited, for example, general purpose polystyrene, high-impact polystyrene, AS resin, ABS resin, AES resin, MBS resin, MAS resin, AAS resin, styrene-butadiene block copolymers, etc.

As the polyethylene resin, there can be cited, for example, high density polyethylene resin, low density polyethylene resin, linear low density polyethylene resin, ethylene/vinyl acetate copolymer, ethylene/-propylene copolymer, ethylene/acrylate copolymer, ethylene/glycidyl (meth)acrylate copolymer, etc.

As the polypropylene resin, there can be cited, for example, polypropylene resin, propylene/vinyl acetate copolymer, propylene/vinyl chloride copolymer, etc.

The polydiene resin is a homopolymer of a monomer having a diene structure or a copolymer of such a monomer with one or more other monomer copolymerizable therewith, and specific examples thereof includes 1,2-polybutadiene resin, trans-1,4-polybutadiene resin, etc.

Examples of the polyamide resin are polymers derived from aminocarboxylic acid compounds, polymers derived from dicarboxylic compound and diamine compounds, polymers obtained by ring opening polymerization, etc.

Potassium titanate, component (A) above, is an artificial mineral represented by general formula: $K_2O \cdot nTiO_2$. It may be in the form of either powder or fiber. Potassium titanate fiber having a tunnel structure is particularly preferred. Before use, it may be surface-treated with a processing agent such as silane coupling agent.

The amount of potassium titanate to be used is not limited particularly. However, when the amount of potassium titanate is such that decrease in molecular weight of the aromatic polycarbonate resin is influenced, that is, 1 part by weight or more per 100 parts by weight of the aromatic polycarbonate resin, the effect of the present invention is obtained, and the use of 5 parts by weight or more of potassium titanate gives remarkable effects. The maximum amount is 60 parts by weight per 100 parts by weight of the aromatic polycarbonate resin.

The organic acid, component (B) above, is carboxylic acids, sulfonic acids, etc., and preferably aromatic carboxylic acids having 15 or less carbon atoms and aliphatic carboxylic acids having 20 or less carbon atoms. Specific examples of the organic acid include aliphatic carboxylic acids such as acetic acid, propionic acid, butyric acid, malonic acid, succinic acid, glutaric acid, stearic acid, maleic acid, maleic anhydride, fumaric acid, citraconic acid, citraconic anhydride, itaconic acid, etc.; and aromatic carboxylic acids such as benzoic acid, phthalic acid, phthalic anhydride, isophthalic acid, terephthalic acid, etc. As the method of compounding the organic acid in the resin, a method in which the organic acid is added together with other components, a method in which potassium titanate is treated with the organic acid in advance, etc. can be used.

N-Phenyl-γ-aminopropyl trimethoxysilane, component (C) above, is a silane coupling agent. The use of other silane coupling agents as the component (C) gives insufficient effects. As the method of compounding the silane compound used in the invention, a method in which the silane compound is compounded together with other components, a method in which potassium titanate is surface-treated with the silane compound in advance, etc. can be used.

The organic acid (B) is used in an amount of 0.1 to 10% by weight based on the weight of potassium titanate (A).

The N-phenyl-γ-aminopropyltrimethoxysilane (C) is used in an amount of 0.01 to 5% by weight based on the weight of potassium titanate (A).

If the amount of the component (B) is below 0.1% by weight, decrease in molecular weight of the aromatic polycarbonate resin as a result of the use of potassium titanate cannot be controlled sufficiently even when a large amount of the component (C) is used. On the other hand, if use is made of more than 10% by weight of the component (B), its effect is no longer increased but instead there arises a problem of failure of appearance (such as silver blister, etc.) of the resulting molded article due to the component (B).

If the amount of the component (C) is less than 0.01% by weight, decrease in molecular weight of the aromatic polycarbonate resin as a result of the use of potassium titanate cannot be prevented enough even if a large amount of the component (B) is used. Meanwhile, if the component (C) is used in an amount larger than 5% by weight, the effect is no longer increased and it is economically disadvantageous.

In the present invention, the use of the both components (B) and (C) in appropriate amount in combination controls decrease in molecular weight of the aromatic polycarbonate resin by the influence of the component (A) to a great extent and also prevents decrease in mechanical properties considerably.

The resin composition of the present invention can be prepared by mixing predetermined amounts of the aforementioned components in a mixer, for example, tumbler, blender, Nauter mixer, Banbury mixer, kneading rolls, extruder, etc. Further, the resin composition of the present invention may also be compounded with various additives, for example, antioxidants, ultraviolet adsorbents, flame retardants, releasing agents, etc. so far as the object of the present invention is not harmed.

The resin composition of the present invention is applicable to any molding method, for example, injection molding, extrusion molding, compression molding, rotation molding, etc. The resulting molded articles maintain excellent properties inherent to the aromatic polycarbonate used and have excellent dimension stability.

Hereafter, the present invention will be described in more detail by examples.

Viscosity-average molecular weight, M, is obtained by obtaining inherent viscosity, $\eta sp$, of a solution of the resin dissolved in methylene chloride at 20° C. in a concentration of 0.7 g/dl, and introducing the value obtained in the following equation:

$$\eta sp/C = [\eta] + 0.45[\eta]^2 C$$

where $$[\eta] = 1.23 \times 10^{-4} M^{0.83}$$

$$C = 0.7$$

The impact strength is measured according to ASTM D-256 [Izod, notched, 1/8″, (kgf cm/cm)].

Examples 1 and 2 and Comparative Examples 1 to 11

To 100 parts by weight of an aromatic polycarbonate resin having a viscosity-average molecular weight of 25,000 (PANLITE L-1250, trade name for a product by Teijin Kasei Co., Ltd.) were added potassium titanate, an organic acid and a silane coupling agent in compounding ratios (part by weight) shown in Table 1, and mixed in a V-type blender. The mixture was then pelletized through a vented twin-screw extruder having a diameter of 30 mm (PCM-30 produced by Ikegai Tekko Co., Ltd.) at a cylinder temperature of 260° C. The pellets obtained were dried at 120° C. for 5 hours, and then molded into a sample for testing impact resistance using an injection extruder (NIKKO J-120SA produced by Nippon Seikosho Co., Ltd.) under conditions of a cylinder temperature of 280° C. and a mold temperature of 70° C. Measurement was made of the impact resistance of the sample thus obtained. On the other hand, viscosity average molecular weights of the pellet and molded article (sample for testing physical properties), respectively, were measured. Results obtained are shown in Table 1. Symbols standing for the compounded components referred to in Table 1 are as follows.

TK: Potassium titanate (Tismo D-102, produced by Otsuka Chemical Co., Ltd. )

MA: Maleic Acid

C-1: N-Phenyl-γ-aminopropyltrimethoxysilane (Silane coupling agent )

C-2: Methyltrimethoxysilane (Silane coupling agent)

C-3: N-(β-aminoethyl ) -γ-aminopropyltrimethoxysilane (Silane coupling agent)

C-4: γ-Glycidoxypropyltrimethoxysilane

TABLE 1

| | Composition (Part by Weight) | | | | | | Impact Strength | Molecular Weight | |
|---|---|---|---|---|---|---|---|---|---|
| | | | Silane Coupling Agent | | | | | | Molded |
| | TK | MA | C-1 | C-2 | C-3 | C-4 | | Pellet | Article |
| Example 1 | 10 | 0.1 | 0.3 | — | — | — | 27 | 23,200 | 22,500 |
| Example 2 | 20 | 0.2 | 0.5 | — | — | — | 10 | 22,200 | 20,300 |
| Comparative Example 1 | 10 | — | — | — | — | — | 14 | 18,500 | 17,100 |
| Comparative Example 2 | 10 | 0.2 | — | — | — | — | 12 | 19,900 | 18,700 |
| Comparative Example 3 | 10 | — | 0.3 | — | — | — | 9 | 18,700 | 17,300 |
| Comparative Example 4 | 10 | — | — | 0.3 | — | — | 5 | 18,000 | 16,900 |
| Comparative Example 5 | 10 | — | — | — | 0.3 | 7 | 7 | 16,500 | 15,500 |
| Comparative Example 6 | 10 | — | — | — | — | 0.3 | 8 | 18,700 | 17,300 |
| Comparative Example 7 | 10 | 0.1 | — | 0.3 | — | — | 7 | 20,400 | 19,300 |
| Comparative Example 8 | 10 | 0.1 | — | — | 0.3 | — | 6 | 18,300 | 17,000 |
| Comparative Example 9 | 10 | 0.1 | — | — | — | 0.3 | 9 | 21,200 | 20,200 |
| Comparative Example 10 | 20 | — | — | — | — | — | 3 | 17,500 | 15,700 |
| Comparative Example 11 | 20 | 0.2 | — | — | — | 0.5 | 4 | 18,700 | 16,800 |

What is claimed is:

1. A resin composition comprising:

(I) a resin component composed of an aromatic polycarbonate resin, or a mixture of 30% by weight or more of an aromatic polycarbonate resin and 70% by weight or less of another thermoplastic resin; and (II) a compounding component including:

(A) potassium titanate in an amount of 1 part by weight or more per 100 parts by weight of said resin component, (B) an organic acid in an amount of 0.1 to 10% by weight based on the weight of said potassium titanate, and (C) N-phenyl-γ-aminopropyltrimethoxysilane in an amount of 0.01 to 5% by weight based on the weight of said potassium titanate.

2. A resin composition as claimed in claim 1, wherein said potassium titanate is contained in an amount of 5 parts by weight or more per 100 parts by weight of said resin component.

3. A resin composition as claimed in claim 1, wherein said aromatic polycarbonate resin has a viscosity average molecular weight of 10,000 to 100.000.

4. A resin composition as claimed in claim 3, wherein said aromatic polycarbonate resin has a viscosity average molecular weight of 13,000 to 40,000.

5. A resin composition as claimed in claim 1, wherein said another thermoplastic resin is at least one resin selected from the group consisting of thermoplastic polyester resins, polyarylene ester resins, polystyrene resins, polyethylene resins, polypropylene resins, polydiene resins, polyamide resins, polyether resins, polysufone resins and polyphenylene sulfide resins.

6. A resin composition as claimed in claim 1, wherein said potassium titanate is present in an amount of not more than 60 parts by weight per 100 parts by weight of said aromatic polycarbonate resin.

7. A resin composition as claimed in claim 1, wherein said organic acid is a carboxylic acid or a sulfonic acid.

8. A resin composition as claimed in claim 7, wherein said carboxylic acid is an aromatic carboxylic acid having 15 or less carbon atoms or an aliphatic carboxylic acid having 20 or less carbon atoms.

* * * * *